United States Patent [19]

Antrim et al.

[11] 4,104,463

[45] * Aug. 1, 1978

[54] METHOD FOR TREATMENT OF CORN HULLS

[75] Inventors: Richard Lee Antrim, Clinton; Donald Wayne Harris, Camanche, both of Iowa

[73] Assignee: Standard Brands Incorporated, New York, N.Y.

[*] Notice: The portion of the term of this patent subsequent to Jul. 26, 1994, has been disclaimed.

[21] Appl. No.: 812,939

[22] Filed: Jul. 5, 1977

Related U.S. Application Data

[63] Continuation-in-part of Ser. No. 689,232, May 24, 1976, Pat. No. 4,038,481.

[51] Int. Cl.$^2$ .......................... C08B 1/00; C08B 37/14
[52] U.S. Cl. ...................................... 536/56; 127/37; 536/1; 536/114; 536/120
[58] Field of Search .................... 536/1, 56, 114, 120; 127/34, 37, 29

[56] References Cited

U.S. PATENT DOCUMENTS

| | | | |
|---|---|---|---|
| 1,819,233 | 8/1931 | Darling | 127/34 |
| 1,856,567 | 5/1932 | Kleinert et al. | 162/14 |
| 2,037,001 | 4/1936 | Aronovsky | 162/14 |
| 2,166,540 | 7/1939 | Bailey | 162/37 |
| 2,218,567 | 10/1940 | White | 536/1 |
| 2,526,607 | 10/1950 | Kurth | 127/37 |
| 2,615,883 | 10/1952 | Sweeney et al. | 127/37 |
| 2,709,699 | 5/1955 | Wolf et al. | 536/1 |
| 2,801,955 | 8/1957 | Rutenberg et al. | 127/37 |
| 2,868,778 | 1/1959 | Watson et al. | 536/114 |
| 3,579,380 | 5/1971 | Friese | 127/37 |
| 3,716,526 | 2/1973 | Schweiger | 536/114 |
| 3,784,408 | 1/1974 | Jaffe et al. | 127/37 |
| 3,878,851 | 4/1975 | Kallianos et al. | 127/37 |
| 3,879,373 | 4/1975 | Gerrish et al. | 536/1 |
| 3,970,712 | 7/1976 | Friese | 127/37 |
| 3,985,815 | 10/1976 | Jaffe et al. | 127/37 |
| 3,990,904 | 11/1976 | Friese et al. | 127/37 |
| 4,038,481 | 7/1977 | Antrim et al. | 536/56 |

FOREIGN PATENT DOCUMENTS

| | | | |
|---|---|---|---|
| 2,358,472 | 5/1975 | Fed. Rep. of Germany | 536/1 |
| 2,365,457 | 5/1975 | Fed. Rep. of Germany | 536/1 |

OTHER PUBLICATIONS

"Chemical Examination of Corn Bran"-Hooper, *Industrial and Engineering Chemistry*, Jun. 1942, pp. 728-729.
"Organosolv Pulping with Aqueous Alcohol"-Kleinert, TAPPI, vol. 57, No. 8, Aug. 1974, pp. 99-102.

*Primary Examiner*—Ronald W. Griffin

[57] ABSTRACT

Corn hulls and like materials are subjected to a treatment to obtain two fractions therefrom comprising a holocellulose fraction and a non-carbohydrate fraction.

3 Claims, No Drawings

METHOD FOR TREATMENT OF CORN HULLS

CROSS-REFERENCES

This is a continuation-in-part of patent application Ser. No. 689,232 filed May 24, 1976 now U.S. Pat. No. 4,038,481, entitled "Method for Treatment of Corn Hulls"-Antrim et al.

BACKGROUND OF THE INVENTION

1. Field of the Invention

This invention relates to the treatment of corn hulls and similar materials. More particularly, this invention relates to the treatment of corn hulls and similar materials to obtain two fractions therefrom comprising a holocellulose fraction and a non-carbohydrate fraction.

2. Description of the Prior Art

Many processes are known in the art for obtaining various fractions from plant materials. For example, wood chips may be treated to obtain cellulose having varying degrees of purity. Typically, wood pulping processes involve treatments at high temperatures under highly alkaline or acid conditions and may include the use of certain chlorine and sulfur compounds to assist in the solubilization of lignin. The liquor resulting from such treatments may comprise mixtures of lignins, hemicellulose, various sugars and degradation products. Efforts have been made to recover various components of the liquor but such have not proven entirely satisfactory due, principally, to the large amounts of degradation products present.

One approach which has been taken to minimize the formation of degradation products is the utilization of alcohols for removal of lignins in the pulping process. U.S. Pat. Nos. 1,856,567 to Kleinert et al. and 2,037,001 to Aronovsky disclose various procedures for the alcoholic extraction of wood pulp. U.S. Pat. No. 2,166,540 to Bailey teaches the treatment of lignified cellulosic material with an aqueous alkaline solution of alcohol. Pulping using aqueous ethanol at high temperatures is described by T. N. Kleinert in Tappi, Vol. 57, No. 8, August 1974.

There are a number of procedures disclosed in the art directed to the extraction of hemicellulose from fibrous waste products such as corn hulls, cotton seed hulls, oat hulls and the like utilizing aqueous alkali. Exemplary of such procedures are those disclosed in U.S. Pat. Nos. 1,819,233 to Darling; 2,218,567 to White; 2,709,699 to Wolf et al.; 2,801,955 to Rutenberg et al.; 2,868,778 to Watson et al.; and 3,879,373 to Gerrish et al. These procedures generally suffer the disadvantage of producing a colored, impure, hemicellulose product. German Offenlegungsschrift Nos. 2,358,472 and 2,365,457 disclose processes for treating oat hulls to recover xylose, cellulose and lignin.

U.S. Pat. No. 3,716,526 to Schweiger teaches a method for producing a relatively pure hemicellulose product whereby corn hulls are first subjected to an alkaline extraction procedure to produce a crude hemicellulose product and then treating such product with an aqueous organic-acid containing liquid to solubilize the impurities.

OBJECTS OF THE INVENTION

It is the principal object of the present invention to provide a process for treating corn hulls and similar materials to obtain two fractions therefrom.

It is a further object of the present invention to provide a process for treating corn hulls and similar materials to obtain two fractions therefrom, one composed of substantial quantities of cellulose and hemicellulose and the other characterized as a non-carbohydrate fraction.

These and other objects will be apparent from the following specification and claims.

SUMMARY OF THE INVENTION

Corn hulls and similar materials are subjected to an alkaline hydrolysis treatment under conditions whereby a non-carbohydrate fraction is solubilized and the resulting residue comprises a holocellulose fraction.

DETAILED DESCRIPTION OF THE INVENTION

The teachings and disclosures of U.S. Pat. No. 4,038,481 entitled "Method for Treatment of Corn Hulls"-Antrim et al. are incorporated herein by reference.

In U.S. Pat. No. 4,038,481, a process is disclosed whereby three fractions are obtained from corn hulls and similar materials. By contrast, the present invention is directed to obtaining two fractions from corn hulls and similar materials. One fraction is composed of substantial quantities of cellulose and hemicellulose and is hereinafter referred to as the holocellulose fraction. The other fraction is non-carbohydrate in character.

The holocellulose fraction has utility as a bodying agent for various products, e.g., food products, and can also be treated to obtain certain sugars, such as arabinose and the like.

Two approaches may be utilized in the present process. Common to both approaches is that in the first step, an alkaline hydrolysis treatment is utilized. In the first approach, the hydrolysis is performed using an alkaline water-miscible organic solvent system. Sufficient water should be present to solubilize the alkali and the non-carbohydrate fraction, but insufficient to solubilize appreciable quantities of the hemicellulose. The amount of water which may be tolerated is dependent upon a number of factors such as the particular solvent utilized, temperature of treatment and the like. In the case when the solvent is ethanol, substantial quantities of hemicellulose will be solubilized if the amount of water exceeds about 40 percent. In general, however, the extraction solution will comprise from about 60 to about 90 percent solvent and the remainder water. This extraction solution will contain the non-carbohydrate fraction. The residue from the extraction treatment will comprise the holocellulose fraction.

In the second approach, the alkaline hydrolysis treatment is carried out under conditions whereby minimal water, for instance, an amount not exceeding about 65 percent based on the weight of the corn hulls and preferably from about 25 to about 55 percent on the same weight basis, is utilized so that the hemicellulose fraction does not migrate from the corn hull structure. Next, the treated corn hulls are contacted with a water-miscible organic solvent to extract the non-carbohydrate fraction. The residue from the extraction treatment will comprise the holocellulose fraction.

A variety of water-miscible organic solvents may be utilized in the present process. Exemplary of such are acetone, methanol, ethanol, propanol, isopropanol, secondary butyl alcohol, tertiary butyl alcohol, and mixtures thereof.

The amount of holocellulose recovered is, of course, dependent upon the conditions under which the alkaline hydrolysis is carried out and, while the cellulose portion thereof is relatively inert in regard to solubilization, the hemicellulose is not and can be relatively easily solubilized if caution is not taken to prevent such from occurring.

The major proportion of the non-carbohydrate fraction may be recovered by solvent extraction under a variety of conditions, although it is preferred that the extraction be performed at least once with an aqueous organic solvent system having a pH below about 4 and more preferably a pH of from about 2 to about 3. This will ensure substantially complete removal of the non-carbohydrate fraction.

The amount of holocellulose obtained in the present process may vary over a range of from about 55 to below about 95 percent, but preferably the holocellulose will be from about 65 to about 80 percent.

The non-carbohydrate fraction contains relatively large quantities of ferulic acid. In the case when the non-carbohydrate fraction obtained is above about 15 percent, such fraction contains above about 10 percent ferulic acid. When the non-carbohydrate fraction obtained is from about 20 to about 25 percent, the ferulic acid content of the extracted non-carbohydrate fraction is from about 10 to about 20 percent, on the same weight basis.

In order to more clearly describe the nature of the present invention, a specific example will hereinafter be described. It should be understood, however, that this is done solely by way of example and is not intended to delineate the scope of the invention or limit the ambit of the appended claims.

Percentages referred to herein are based upon the weight of the corn hulls or like material unless otherwise specified.

EXAMPLE I

This Example illustrates the separation of corn hulls into holocellulose and non-carbohydrate fractions.

Corn hulls from a corn wet milling operation were placed on a U.S. #6 screen and sprayed with sufficient water at a temperature of 50° C to remove the fine fiber, most of the starch and some proteinaceous and lipid material. The corn hulls retained on the screen were slurried in water at a solids concentration of 10 percent, the pH was adjusted with lime to approximately 6.5, and sufficient amount of alpha-amylase (Novo Termamyl-60) was added to the slurry to obtain therein a dosage of about three liquefons/g of hull solids. The hulls were filtered, washed and dried.

Into a 250 ml 3-neck flask equipped with stirrer, heater and condenser was placed 14.18 g dry basis of corn hulls and 150 ml of 63.3 percent (v/v) aqueous isopropanol containing 1.5 g of sodium hydroxide. The reaction mixture was stirred and heated at reflux for four hours then cooled and filtered through a medium porosity sintered glass funnel. The insoluble residue was suspended in 150 ml of 63.3 percent (v/v) aqueous isopropanol, the pH was adjusted to 3.0 using dilute hydrochloric acid and the suspension was stirred approximately one hour at room temperature. The mixture was filtered through a sintered glass funnel and the extraction process was again repeated using 150 ml of 63.3 percent (v/v) aqueous isopropanol. All filtrates were combined, the pH was adjusted to 3.0 using dilute hydrochloric acid and the volume was adjusted to one liter with isopropanol. Twenty ml of this solution was taken to dryness at approximately 25° C using a rotary evaporator and reduced pressure. The dry sample was then analyzed for ferulic acid content by gas-liquid chromatography.

The holocellulose residue was first air dried and then dried in a vacuum oven at 105° C.

The ferulic acid content of the non-carbohydrate fraction was 17.7 percent which represented a yield of 3.43 percent dry basis based on the starting corn hulls.

Yields obtained were 80.3% holocellulose and 19.4% non-carbohydrate fraction, based on dry basis corn hulls.

Analysis of Corn Hull Holocellulose

Dry Substance — 99.19%
% Ash, d.b. — 1.05
% Protein (N x 6.25), d.b. — 0.49
% Fat (Hexane), d.b. — 0.32
% Lignin, d.b. — 0.05

The terms and expressions which have been employed are used as terms of description and not of limitation, and it is not intended in the use of such terms and expressions to exclude any equivalents of the features shown and described or portions thereof, since it is recognized that various modifications are possible within the scope of the invention claimed.

What is claimed is:

1. A method for treating corn hulls wherein said materials are subjected to an alkaline hydrolysis treatment under conditions whereby a non-carbohydrate fraction is solubilized and the resulting residue comprises a holocellulose fraction.

2. A method for treating corn hulls as defined in claim 1, wherein the alkaline hydrolysis treatment is performed utilizing a water-miscible organic solvent containing an alkali and sufficient water to solubilize the alkali and the non-carbohydrate fraction but insufficient to solubilize a substantial portion of the holocellulose fraction.

3. A method for treating corn hulls as defined in claim 1, wherein the alkaline hydrolysis treatment is carried out utilizing insufficient water to solubilize the non-carbohydrate fraction or a substantial portion of the holocellulose fraction and then contacting the treated materials with a water-miscible organic solvent to solubilize the non-carbohydrate fraction.

* * * * *